United States Patent
Iftime et al.

(10) Patent No.: US 9,328,251 B2
(45) Date of Patent: May 3, 2016

(54) PHASE CHANGE MAGNETIC INK AND PROCESS FOR PREPARING SAME

(71) Applicant: Xerox Corporation, Norwalk, CT (US)

(72) Inventors: Gabriel Iftime, Mississauga (CA); C. Geoffrey Allen, Waterdown (CA); Peter G. Odell, Mississauga (CA); Caroline Turek, Mississauga (CA)

(73) Assignee: Xerox Corporation, Norwalk, CT (US)

(*) Notice: Subject to any disclaimer, the term of this patent is extended or adjusted under 35 U.S.C. 154(b) by 199 days.

(21) Appl. No.: 13/972,140

(22) Filed: Aug. 21, 2013

(65) Prior Publication Data

US 2013/0335477 A1    Dec. 19, 2013

Related U.S. Application Data

(62) Division of application No. 12/976,451, filed on Dec. 22, 2010, now Pat. No. 8,544,999.

(51) Int. Cl.

| | |
|---|---|
| C09D 11/38 | (2014.01) |
| C09D 11/34 | (2014.01) |
| B22F 9/30 | (2006.01) |
| H01F 1/00 | (2006.01) |
| B82Y 30/00 | (2011.01) |
| B41J 2/175 | (2006.01) |

(52) U.S. Cl.
CPC .............. C09D 11/38 (2013.01); B22F 9/305 (2013.01); B82Y 30/00 (2013.01); C09D 11/34 (2013.01); H01F 1/0054 (2013.01); B22F 2998/00 (2013.01); B41J 2/17593 (2013.01); C22C 2202/02 (2013.01)

(58) Field of Classification Search
CPC ...... B41J 2/17593; C09D 11/12; C09D 11/34; C09D 11/36; C09D 11/38; B22F 9/305
USPC ................. 347/88, 99, 100; 106/31.29, 31.61
See application file for complete search history.

(56) References Cited

U.S. PATENT DOCUMENTS

| | | | |
|---|---|---|---|
| 6,262,129 B1 * | 7/2001 | Murray et al. | 516/33 |
| 6,860,930 B2 * | 3/2005 | Wu et al. | 106/31.29 |
| 2009/0321676 A1 * | 12/2009 | Breton et al. | 252/62.53 |
| 2009/0325098 A1 * | 12/2009 | Veregin et al. | 430/108.3 |

* cited by examiner

*Primary Examiner* — Matthew Luu
*Assistant Examiner* — Rut Patel
(74) *Attorney, Agent, or Firm* — Marylou J. Lavoie, Esq. LLC

(57) ABSTRACT

An in situ process for preparing a phase change magnetic ink including heating a phase change ink composition to a first temperature sufficient to provide a melt composition; wherein the phase change ink composition comprises a carrier, an optional colorant, and an optional dispersant; placing the melt composition under inert atmosphere; heating the melt composition to a second temperature sufficient to effect decomposition of a metal carbonyl; adding the metal carbonyl to the melt composition under inert atmosphere at this second temperature to form metal nanoparticles thus forming in situ a phase change magnetic ink including the metal nanoparticles; optionally, filtering the phase change magnetic ink while in a liquid state; and cooling the phase change magnetic ink to a solid state.

11 Claims, 3 Drawing Sheets

PHASE CHANGE MAGNETIC INK AND PROCESS FOR PREPARING SAME

This application is a divisional of U.S. application Ser. No. 12/976,451, filed Dec. 22, 2010, U.S. Publication Number US-2012-0162330-A1, the disclosure of which is totally incorporated by reference herein.

RELATED APPLICATIONS

Commonly assigned U.S. patent application Ser. No. 12/976,410, entitled "Phase Change Magnetic Ink And Process For Preparing Same"), filed concurrently herewith, which is hereby incorporated by reference herein in its entirety, describes an in situ process for preparing a phase change magnetic ink including combining a phase change ink composition with a reducing agent; wherein the phase change ink composition comprises a carrier, an optional colorant, and an optional dispersant, and wherein the reducing agent has at least one alcohol functionality; heating the combined phase ink composition and reducing agent to a first temperature sufficient to provide a melt composition; adding a metal salt to the melt composition under an inert atmosphere to provide a metal salt-melt composition; heating the metal salt-melt composition to a second temperature sufficient to effect a metal reduction reaction to reduce the metal salt to metal nanoparticles thus forming in situ a phase change magnetic ink including the metal nanoparticles; optionally, filtering the phase change magnetic ink while in a liquid state; cooling the phase change magnetic ink to a solid state.

BACKGROUND

Disclosed herein is a phase change magnetic ink and an in situ process for preparing a phase change magnetic ink comprising heating a phase change ink composition to a first temperature sufficient to provide a melt composition; wherein the phase change ink composition comprises a carrier, an optional colorant, and an optional dispersant; placing the melt composition under inert atmosphere; heating the melt composition to a second temperature sufficient to effect decomposition of a metal carbonyl; adding the metal carbonyl to the melt composition under an inert atmosphere at this second temperature to form metal nanoparticles thus forming in situ a phase change magnetic ink including the metal nanoparticles; optionally, filtering the phase change magnetic ink while in a liquid state, and; cooling the phase change magnetic ink to a solid state.

Magnetic Ink Character Recognition (MICR) ink contains a magnetic pigment or a magnetic component in an amount sufficient to generate a magnetic signal strong enough to be readable via a MICR reader. Generally, the ink is used to print all or a portion of a document, such as checks, bonds, security cards, etc.

U.S. Pat. No. 5,667,924, which is hereby incorporated by reference herein in its entirety, describes in the Abstract thereof an image character recognition process comprising forming an image in a predetermined size and predetermined shape on a receiver member with a marking composition containing a superparamagnetic component, detecting the predetermined size and predetermined shape of the formed image by placing the resulting image bearing receiver member in a magnetic sensing field comprising at least one magnetic sensor and forming a magnetic size and magnetic shape profile map of the detected image, and recognizing the detected image by comparing the magnetic size and magnetic shape profile map of the formed image with reference magnetic profile image maps.

MICR inks or toners are made by dispersing magnetic particles into an ink base. There are numerous challenges in developing a MICR ink jet ink. For example, most ink jet printers limit considerably the particle size of any particulate components of the ink, due to the very small size of the ink jet print head nozzle that expels the ink onto the substrate. The size of the ink jet head nozzle openings are generally on the order of about 40 to 50 microns, but can be less than 10 microns in diameter. This small nozzle size requires that the particulate matter contained in an ink jet ink composition must be of a small enough size to avoid nozzle clogging problems. Even when the particle size is smaller than the nozzle size, the particles can still agglomerate or cluster together to the extent that the size of the agglomerate exceeds the size of the nozzle opening, resulting in nozzle blockage. Additionally, particulate matter may be deposited in the nozzle during printing, thereby forming a crust that results in nozzle blockage and/or imperfect flow parameters.

Further, a MICR ink jet ink must be fluid at jetting temperature and not dry. An increase in pigment size can cause a corresponding increase in ink density thereby making it difficult to maintain the pigments in suspension or dispersion within a liquid ink composition.

MICR inks contain a magnetic material that provides the required magnetic properties. The magnetic material must retain a sufficient charge so that the printed characters retain their readable characteristic and are easily detected by the detection device or reader. The magnetic charge retained by a magnetic material is known as "remanence." The "coercive force" of a magnetic material refers to the magnetic field H which must be applied to a magnetic material in a symmetrical, cyclically magnetized fashion to make the magnetic induction B vanish. The coercivity of a magnetic material is thus the coercive force of the material in a hysteresis loop whose maximum induction approximates the saturation induction. The observed remanent magnetization and the observed coercivity of a magnetic material depend on the magnetic material having some anisotropy to provide a preferred orientation for the magnetic moment in the crystal. Four major anisotropy forces determine the particle coercive force: magnetocrystalline anisotropy, strain anisotropy, exchange anisotropy, and shape anisotropy. The two dominant anisotropies are: 1) shape anisotropy, where the preferred magnetic orientation is along the axis of the magnetic crystal, and 2) magnetocrystalline anisotropy, where the electron spin-orbit coupling aligns the magnetic moment with a preferred crystalline axis.

The magnetic material must exhibit sufficient remanence once exposed to a source of magnetization in order to generate a MICR-readable signal and have the capability to retain the same over time. Generally, an acceptable level of charge, as set by industry standards, is between 50 and 200 Signal Level Units, with 100 being the nominal value, which is defined from a standard developed by ANSI (American National Standards Institute). A lesser signal may not be detected by the MICR reading device, and a greater signal may not give an accurate reading. Because the documents being read employ the MICR printed characters as a means of authenticating or validating the presented documents, it is important that the MICR characters or other indicia be accurately read without skipping or misreading characters. Therefore, for purposes of MICR, remanence is preferably a minimum of 20 emu/g (electromagnetic unit/gram). A higher remanence value corresponds to a stronger readable signal.

Remanence tends to increase as a function of particle size and the density of the magnetic pigment coating. Accordingly, when the magnetic particle size decreases, the magnetic particles experience a corresponding reduction in remanence. Achieving sufficient signal strength thus becomes increasingly difficult as the magnetic particle size diminishes and the practical limits on percent content of magnetic particles in the ink composition are reached. A higher remanence value will require less total percent magnetic particles in the ink formula, improve suspension properties, and reduce the likelihood of settling as compared to an ink formula with higher percent magnetic particle content.

Additionally, MICR ink jet inks must exhibit low viscosity, typically on the order of less than 15 centipoise (cP) or about 2 to 8 cP at jetting temperature (jetting temperature ranging from about 25° C. to about 140° C.) in order to function properly in both drop-on-demand type printing equipment, such as thermal bubble jet printers and piezoelectric printers, and continuous type printing apparatus. The use of low viscosity fluids, however, adds to the challenge of successfully incorporating magnetic particles into an ink dispersion because particle settling will increase in a less viscous fluid as compared to a more viscous fluid.

U.S. Patent Publication Number 2009/0321676A1, which is hereby incorporated by reference herein in its entirety, describes in the Abstract thereof an ink including stabilized magnetic single-crystal nanoparticles, wherein the value of the magnetic anisotropy of the magnetic nanoparticles is greater than or equal to $2 \times 10^4$ J/m$^3$. The magnetic nanoparticle may be a ferromagnetic nanoparticle, such as FePt. The ink includes a magnetic material that minimizes the size of the particle, resulting in excellent magnetic pigment dispersion stability, particularly in non-aqueous ink jet inks. The smaller sized magnetic particles of the ink also maintain excellent magnetic properties, thereby reducing the amount of magnetic particle loading required in the ink.

Water-based MICR ink is commercially available. Water-based MICR ink requires special print-heads to be used with certain ink jet printing technology such as phase change or solid ink technology. There is further a concern with respect to possible incompatibility when operating both solid ink and water-based ink in the same printer. Issues such as water evaporation due to the proximity to the solid ink heated ink tanks, rust, and high humidity sensitivity of the solid ink are issues which must be addressed for implementation of a water-based MICR ink in a solid ink apparatus.

Currently, there are no commercially available phase change or solid MICR inks. There is a need for a MICR ink suitable for use in phase change or solid ink jet printing. There are numerous challenges in developing a MICR ink suitable for use in phase change or solid ink jet printing. MICR phase change ink processes are particularly challenging with magnetic pigments because (1) inorganic magnetic particles are incompatible with the organic base components of phase change ink carriers, and (2) magnetic pigments are much denser than typical organic pigments (the density of iron is about 8 g/cm$^3$, for example) which can result in unfavorable particle settling, and (3) uncoated metal magnetic nanoparticles are pyrophoric thus presenting a safety issue. Further, in order to make a solid ink composition from these particles, a complex process would be required including preparation of the magnetic particles, washing of the nano-particles, followed by a multi-step procedure for fabrication of solid ink compositions containing the magnetic pigments.

Currently available MICR inks and methods for preparing MICR inks are suitable for their intended purposes. However, a need remains for phase change magnetic inks, and for phase change MICR ink jet inks, that have reduced magnetic material particle size, improved magnetic pigment dispersion and dispersion stability along with the ability to maintain excellent magnetic properties at a reduced particle loading. Further, a need remains for MICR phase change inks that are suitable for use in phase change ink jet printing technology. Further, a need remains for a process for preparing a phase change magnetic ink, such as a phase change MICR ink, that is simplified, versatile, environmentally safe, capable of producing a highly dispersible magnetic ink having stable particle dispersion, allowing for safe processing of metal nanoparticles, cost effective, and green.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is an in situ process for preparing a phase change magnetic ink comprising heating a phase change ink composition to a first temperature sufficient to provide a melt composition; wherein the phase change ink composition comprises a carrier, an optional colorant, and an optional dispersant; placing the melt composition under inert atmosphere; heating the melt composition to a second temperature sufficient to effect decomposition of a metal carbonyl; adding the metal carbonyl to the melt composition under inert atmosphere at this second temperature to form metal nanoparticles thus forming in situ a phase change magnetic ink including the metal nanoparticles; optionally, filtering the phase change magnetic ink while in a liquid state; and cooling the phase change magnetic ink to a solid state.

Also described is a phase change magnetic ink comprising a phase change ink composition comprising a carrier, an optional colorant, an optional dispersant, and metal nanoparticles dispersed within the phase change ink, wherein the metal nanoparticles originate from a thermal decomposition of a metal carbonyl.

DETAILED DESCRIPTION

Figure 1:
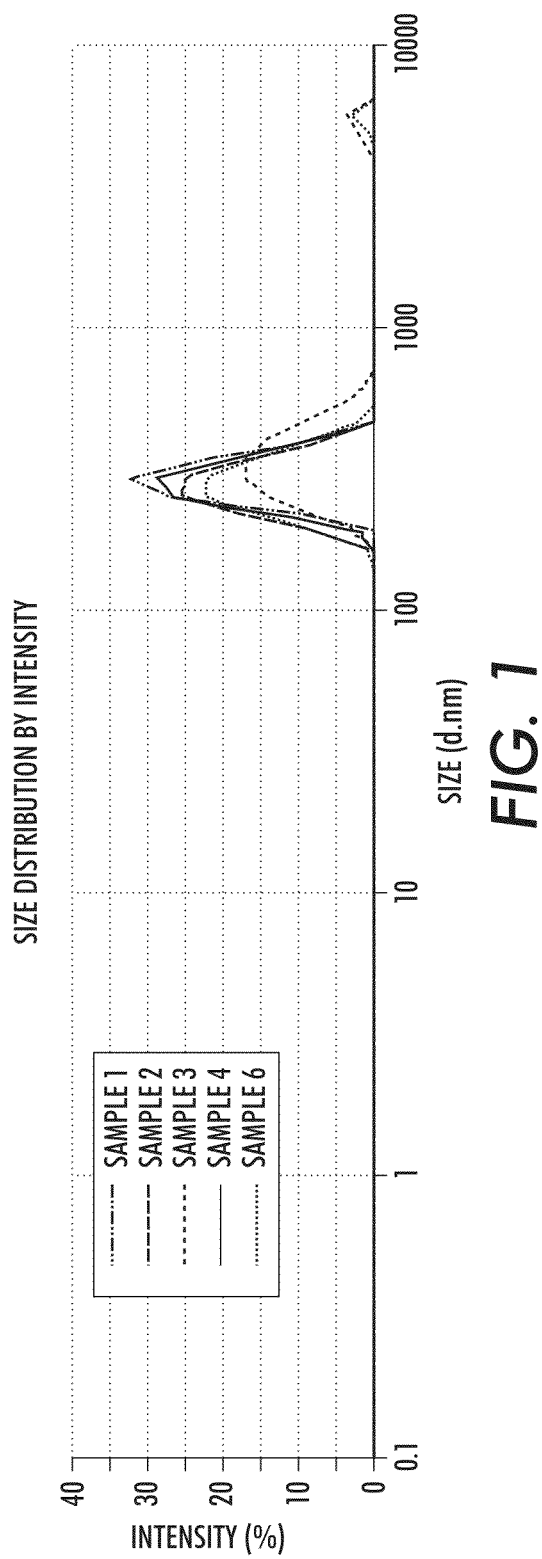
FIG. 1 is a graph showing intensity (%, y axis) versus size distribution (diameter, nanometer, x axis) for metal particles in a magnetic ink of the present disclosure.

An in situ process for preparing a phase change magnetic ink is described comprising heating a phase change ink composition to a first temperature sufficient to provide a melt composition; wherein the phase change ink composition comprises a carrier, an optional colorant, and an optional dispersant; placing the melt composition under inert atmosphere; heating the melt composition to a second temperature sufficient to effect decomposition of a metal carbonyl; adding the metal carbonyl to the melt composition under an inert atmosphere at this second temperature to form metal nanoparticles thus forming in situ a phase change magnetic ink including the metal nanoparticles; optionally, filtering the phase change magnetic ink while in a liquid state, and; cooling the phase change magnetic ink to a solid state. Also described is a phase change magnetic ink comprising a phase change ink composition comprising a carrier, an optional colorant, an optional dispersant, and metal nanoparticles dispersed within the phase change ink, wherein the metal nanoparticles originate from a thermal decomposition of a metal carbonyl.

The present process provides a magnetic ink prepared in situ in a one step process by thermal decomposition of a metal carbonyl or a combination of metal carbonyls directly into an ink base (or carrier). The decomposition process provides metal nanoparticles dispersed in the ink base and carbon monoxide as the only byproduct. Being a gas, the carbon monoxide is removed from the ink composition and as a result, no side product is present in the final ink. Therefore, in embodiments, the present phase change magnetic ink is substantially free of impurities, in particular, is free of metal salt impurities. The metal magnetic nanoparticles herein are formed as already functionalized particles during preparation. As a result, the present process provides advantages over previous known mechanically driven pigment dispersion techniques including, but not limited to: (1) a highly and easily dispersible magnetic ink, (2) little or no settling of magnetic particles, (3) safe handling as the metal nanoparticles are already functionalized in the process, (4) cost effective, comprising a one-step procedure rather than the previous known complex multi-step procedure, (5) a green process, for example because reduced energy is required, (6) suitable for any ink base or carrier material desired. In embodiments, the process can be employed in any ink base or carrier desired since no additional chemical component is required to initiate the formation of the metal nanoparticles.

Heating the phase ink composition to a first temperature sufficient to provide a melt composition can comprise heating to any temperature suitable to provide a melt composition for the selected materials. In embodiments, heating to a first temperature comprises heating to a temperature of about 80 to about 300° C., or about 100 to about 250° C., or about 100 to about 180° C.

Placing the melt composition under inert atmosphere can be done by various means. For example, the melt mixture can be first placed under vacuum by using a vacuum pump to remove air and moisture present in the reaction vessel, followed by refilling the reaction vessel with inert gas. Alternatively, the melt mixture can just be kept under a constant flow of inert gas, for a sufficient time needed to remove air and moisture from the vessel. Typical inert gases which can be used include nitrogen and argon containing no more than about 5 parts per million (ppm) air and about 5 ppm moisture traces. The continuous flow of inert gas is needed for two reasons: (1) to prevent oxidation of the metal nanoparticles as formed which would result in reduce magnetic properties, and (2) to prevent potential ignition of the metal carbonyl used for producing magnetic metal nanoparticles since many of metal carbonyls are known to be pyrophoric. If this is the case, the pyrophoric tendency of a given metal carbonyl is typically stated in the MSDS (Material Safety Data Sheet) provided by the supplier together with the metal carbonyl product.

Heating the melt composition to a second temperature sufficient to effect a thermal decomposition reaction to effect decomposition of the metal carbonyl can comprise heating to any temperature suitable to effect the thermal decomposition reaction for the selected materials. In embodiments, heating to a second temperature comprises heating to a temperature of about 150 to about 350° C., or about 200 to about 350° C., or about 300° C.

Optionally, filtering of the phase change magnetic ink while in a liquid state can be done by any suitable or desired method. In embodiments, the phase change magnetic ink is filtered using a nylon cloth filter. In embodiments, the phase change magnetic ink is optionally filtered through a 1 micrometer nylon filter or a 5 micrometer nylon filter in a 70 millimeter Mott filtration assembly (available from Mott Corporation, Farmington, Conn.) at 135° C.

The process described herein provides a magnetic ink that is made in situ, as a one step reaction, using thermal decomposition of one or more metal carbonyls directly in an ink base. The magnetic nanoparticles can be constituted with the known metals having ferro-magnetic properties, such as Fe, Co, Ni and/or alloys made of these metals. As a result, the magnetic metal nanoparticles are directly stabilized by being functionalized with at least one of the phase change ink composition components, for example, the phase change ink carrier (or base), the optional dispersant, or a combination thereof, when the magnetic nanoparticles are being prepared. The process by which the carrier or, more generally, a dispersant, attaches to the surface of metal nanoparticles is complex. Typically, polar functional groups interact with active functional groups present on the surface of the metal nanoparticles. One functional group usually present on the surface of metal nanoparticles is the hydroxyl group which can interact by hydrogen bonding with hydrogen bond forming groups present on the dispersant. Typical functional groups which may be present in the dispersant molecule and which can act as hydrogen bond forming groups include, for example, primary and secondary amines ($-NH_2$; $-NHR$), amides ($-C(O)NH_2$ and $-C(O)NHR$), alcohols ($R-OH$), and carboxylic acid groups ($-COOH$). In embodiments, the process thereby eliminates dispersibility and settling problems. Depending on the size and shape of the formed magnetic metal nanoparticles, the inks made according to the present disclosure may be used for MICR applications as well as for magnetic encoding or security printing applications, among others.

The process comprises an in situ process meaning preparing the metal nanoparticles in situ while simultaneously preparing the phase change ink. In a specific embodiment, the process comprises preparing metal nanoparticles using thermal decomposition of one or more metal carbonyl components while simultaneously preparing the phase change ink. The thermal decomposition of metal carbonyl for producing metal nanoparticles employs one or more metal carbonyl components, and optionally employs one or more dispersants, to effect thermal decomposition of the metal carbonyl to metal nanoparticles while simultaneously preparing the ink composition. The thermal decomposition reaction occurs at high temperatures such as from about 150° C. to about 350° C., or about 200° C. to about 350° C., or about 300° C. For example, thermal decomposition of metal carbonyl for preparing a metal nanoparticle can comprise reacting a metal carbonyl in an ink base under inert atmosphere at a suitable temperature, such as from about 200° C. to 350° C., as follows:

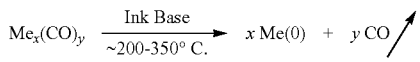

wherein $Me_x$ is a metal, x is an integer of from 1 to 10;

$(CO)_y$ is a carbonyl group (C=O), and y is an integer of from 1 to 30, representing the number of carbonyl groups;

wherein Me(0) is the metal nanoparticle product, and wherein 0 indicates zero oxidation in the metal state; and wherein yCO is carbon monoxide, and y is an integer of from 1 to 10.

The metal carbonyl can be any suitable or desired metal carbonyl. In embodiments, the metal carbonyl is selected from the group consisting of iron carbonyl, cobalt carbonyl, and nickel carbonyl. In further embodiments, the metal carbonyl is selected from the group consisting of iron pentacarbonyl, di-iron nonacarbonyl, tri-iron dodecacarbonyl, cobalt tricarbonylnitrosyl, cyclopentadienylcobalt-tricarbonyl, dicobalt octacarbonyl, chromium hexacarbonyl, nickel tetracarbonyl, and dimanganese decacarbonyl.

The metal carbonyl can be prepared by any suitable or desired method. In embodiments, the metal carbonyl can be prepared by reacting high purity and oxide free finely divided metal powders with carbon monoxide at room temperature. Metal carbonyl materials are also available commercially. For example, iron pentacarbonyl and other metal carbonyls are available from Sigma-Aldrich.

The metal carbonyl can be added at any suitable or desire rate. In embodiments, the metal carbonyl is added slowly to enhance metal nanoparticle formation.

Following addition of the metal carbonyl, the metal carbonyl-phase change ink composition can be heated for any suitable or desired time to prepare the phase change ink and effect the thermal decomposition of the metal carbonyl. In embodiments, the metal carbonyl-phase change ink composition is heated for up to about 5 hours.

The phase change magnetic ink thus formed can be cooled to a lower temperature wherein it is still in a melt state and, optionally, filtered while in a liquid state to provide a magnetic ink. This lower temperature can be any suitable or desired temperature that is less than the thermal decomposition reaction temperature while allowing the composition to remain in liquid state. In embodiments, this lower temperature is from about 100 to about 180° C.

The phase change magnetic ink can then be cooled to a solid state. In embodiments, the phase change magnetic ink is a solid at ambient temperature, such as from about 20 to about 30° C. or about 25° C.

The carbon monoxide reaction product can be removed by any suitable or desired method. In embodiments, the carbon monoxide can be captured using specialized industrial scale technology as is known in the art.

Thus, the method herein provides a process that is solvent free and produces a jettable phase change magnetic ink in a one-step process including the in situ formation of metal nanoparticles via thermal decomposition of metal carbonyl in the phase change ink carrier. Metal nanoparticles, rather than less magnetic metal oxides or other materials, are part of the true jettable phase change ink (not, for example, merely a dispersion of nanoparticles in polymer).

Metal nanoparticles herein are desirably in the nanometer size range. For example, in embodiments, the metal nanoparticles have an average particle size (such as particle diameter or longest dimension) of from about 1 to about 300 nanometers (nm), or about 3 to about 100 nm, or about 5 to about 100 nm. Herein, "average" particle size is typically represented as $d_{50}$, or defined as the volume median particle size value at the 50th percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from a Dynamic Light Scattering measurement. Alternatively, the particles size can be obtained from images of the particles generated by Transmission Electron Microscopy.

Any suitable or desired metal can be used as the metal in the metal carbonyl. In embodiments, the metal is selected from the group consisting of Fe, Co, and Ni, alloys, or combinations thereof.

In embodiments, two types of magnetic metal based phase change inks can be obtained by the process herein, depending on the particle size and shape: ferromagnetic phase change ink and superparamagnetic phase change ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic phase change inks. Superparamagnetic inks are also magnetized in the presence of a magnetic field but they lose their magnetization in the absence of a magnetic field. The main application of superparamagnetic inks is for security printing, although not limited to that application. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

In other embodiments, the metal nanoparticles are bimetallic or trimetallic nanoparticles. In further embodiments, the metal nanoparticles are selected from the group consisting of Fe, Mn, Co, Ni, or a combination thereof. In other embodiments, the metal nanoparticles comprise at least one of Fe, Ni, and Co.

The phase change magnetic ink herein can include any desired or effective carrier (or base) composition. Examples of suitable ink carrier materials include fatty amides, such as monoamides, tetraamides, mixtures thereof, and the like. Specific examples of suitable fatty amide ink carrier materials include stearyl stearamide, a dimer acid based tetra-amide that is the reaction product of dimer acid, ethylene diamine, and stearic acid, a dimer acid based tetra-amide that is the reaction product of dimer acid, ethylene diamine, and a carboxylic acid having at least about 36 carbon atoms, and the like, as well as mixtures thereof. When the fatty amide ink carrier is a dimer acid based tetra-amide that is the reaction product of dimer acid, ethylene diamine, and a carboxylic acid having at least about 36 carbon atoms, the carboxylic acid is of the general formula

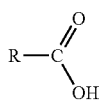

wherein R is an alkyl group, including linear, branched, saturated, unsaturated, and cyclic alkyl groups, said alkyl group in one embodiment having at least about 36 carbon atoms, in another embodiment having at least about 40 carbon atoms, said alkyl group in one embodiment having no more than about 200 carbon atoms, in another embodiment having no more than about 150 carbon atoms, and in yet another embodiment having no more than about 100 carbon atoms, although the number of carbon atoms can be outside of these ranges. Carboxylic acids of this formula are commercially available from, for example, Baker Petrolite, Tulsa, Okla., and can also be prepared as described in Example 1 of U.S. Pat. No. 6,174,937, the disclosure of which is totally incorporated herein by reference. Further information on fatty amide carrier materials is disclosed in, for example, U.S. Pat. Nos. 4,889,560, 4,889,761, 5,194,638, 4,830,671, 5,372,852, 5,597,856, 6,174,937, and British Patent GB 2 238 792, the disclosures of each of which are totally incorporated herein by reference.

Also suitable as phase change ink carrier materials are isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780,528, 5,782,966, 5,783,658, 5,827,918, 5,830,942, 5,919,839, 6,255,432, 6,309,453, British Patent GB 2 294 939, British Patent GB 2 305 928, PCT Publication WO 94/14902, and PCT Publication WO 95/04760, the disclosures of each of which are totally incorporated herein by reference.

Mixtures of fatty amide materials and isocyanate-derived materials can also be employed as the ink carrier composition for inks of the present disclosure.

Additional suitable phase change ink carrier materials for the present disclosure include paraffins, microcrystalline waxes, polyethylene waxes, ester waxes, amide waxes, fatty acids, fatty alcohols, fatty amides and other waxy materials, sulfonamide materials, resinous materials made from different natural sources (such as, for example, tall oil rosins and rosin esters), and many synthetic resins, oligomers, polymers and copolymers, such as ethylene/vinyl acetate copolymers, ethylene/acrylic acid copolymers, ethylene/vinyl acetate/acrylic acid copolymers, copolymers of acrylic acid with polyamides, and the like, ionomers, and the like, as well as mixtures thereof. One or more of these materials can also be employed in a mixture with a fatty amide material and/or an isocyanate-derived material. Additional ink carrier materials may be added to the ink mixture after formation of the metal nanoparticles. In embodiments, the process herein can comprise adding one or more ink carrier components after adding the metal carbonyl to the melt composition under inert atmosphere at the second temperature to form metal nanoparticles.

The carrier can be present in any suitable or desired amount. In embodiments, the ink carrier is present in the phase change ink in an amount of about 0.1 percent to no more than about 99 percent by weight based on the total weight of the ink.

In embodiments, a dispersant may be included in the ink base. The dispersant can be added at any suitable or desired time. In embodiments, the process comprises adding the metal carbonyl and the dispersant to the melt composition at the same time. The dispersant's role is to ensure improved dispersion stability of the magnetic nanoparticles. Suitable dispersants include those typically used in various solvent based processes including, but not limited to, oleic acid; trioctyl phosphine oxide (TOPO), hexyl phosphonic acid (HPA); polyvinylpyrrolidone (PVP), and combinations thereof. Additional suitable dispersants include beta-hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), and combinations thereof. In embodiments, the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

The dispersant can enable control of particle size. In addition the dispersant can enable control of the magnetic nanoparticles shape. In specific embodiments, dispersant is employed to effect production of acicular magnetic nanoparticles. Particle shape anisotropy can provide significant enhancement of the magnetic remanence (i.e. the property responsible, for example, for ferromagmagnetic behavior). Particle shape anisotropy can be provided by selecting two or more different dispersants. For example, rod-shaped iron nanoparticles can be prepared in butanol by using TOPO and didodecyldimethylammonium bromide (DDAB) successively. For further detail, see, for example, J. Park et al., J. Am. Chem. Soc., 2000, 122, 8581-2). Cobalt nanoparticles can be obtained in dichlorobenzene from $Co_2(CO)_8$ by using TOPO and oleic acid as two different dispersants.

In embodiments, the dispersant herein comprises at least a first dispersant and at least a second dispersant, wherein the first and second dispersant are different.

The dispersant can be present in any suitable or desired amount. In embodiments, the dispersant is present in the phase change ink in an amount of from about $1 \times 10^{-5}$% by weight of the ink carrier to about 30% by weight of the ink carrier.

The phase change magnetic inks of the present disclosure can further contain a colorant compound. This optional colorant can be present in the ink in any desired or effective amount to obtain the desired color or hue or to provide sufficient optical density. In embodiments, the colorant is present in an amount of from about 1 percent to about 20 percent by weight based on the total weight of the ink composition. The colorant can be any suitable or desired colorant including dyes, pigments, mixtures thereof, and the like. In embodiments, the phase change magnetic inks herein can include a pigment, specifically, a black pigment, such as carbon black.

The phase change magnetic inks of the present disclosure can also optionally contain an antioxidant. The antioxidant can protect ink images from oxidation and also can protect the ink components from oxidation during the heating portion of the ink preparation process. Specific examples of suitable antioxidants include NAUGUARD® 524, NAUGUARD®

76, and NAUGUARD® 512, commercially available from Uniroyal Chemical Company, Oxford, Conn., IRGANOX® 1010, commercially available from Ciba Geigy, and the like. When present, the optional antioxidant is present in the ink in any desired or effective amount, such as from about 0.01 percent to about 20 percent by weight of the ink carrier.

The inks of the present disclosure can also optionally contain a viscosity modifier. Examples of suitable viscosity modifiers include aliphatic ketones, such as stearone, and the like. When present, the optional viscosity modifier is present in the ink in any desired or effective amount, such as from about 0.1 to about 99 percent by weight of the ink carrier.

Other optional additives to the inks include clarifiers, tackifiers, adhesives, plasticizers, and the like, in any suitable or desired amount such as from about 0.1 to about 50 percent by weight of the ink carrier.

In embodiments, the phase change magnetic ink compositions herein have melting points of no lower than about 50° C. and no higher than about 100° C., although the melting point can be outside of these ranges.

In embodiments, the phase change magnetic ink compositions herein have melt viscosities at the jetting temperature (in embodiments no lower than about 75° C. and no higher than about 180° C., although the jetting temperature can be outside of these ranges) of no more than about 30 centipoise or no less than about 1 centipoise, although the melt viscosity can be outside of these ranges.

The phase change magnetic inks of the present disclosure can be employed in apparatus for direct printing ink jet processes and in indirect (offset) printing ink jet applications. Another embodiment of the present disclosure is directed to a process which comprises incorporating a phase change magnetic ink of the present disclosure into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. In embodiments, the substrate is a final recording sheet and droplets of the melted ink are ejected in an imagewise pattern directly onto the final recording sheet. Yet another embodiment of the present disclosure is directed to a process which comprises incorporating an ink of the present disclosure into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements. In embodiments, the intermediate transfer member is heated to a temperature above that of the final recording sheet and below that of the melted ink in the printing apparatus. Inks of the present disclosure can also be employed in other hot melt printing processes, such as hot melt acoustic ink jet printing, hot melt thermal ink jet printing, hot melt continuous stream or deflection ink jet printing, and the like. Phase change inks of the present disclosure can also be used in printing processes other than hot melt ink jet printing processes.

In embodiments, a process herein comprises (1) incorporating into an ink jet printing apparatus a phase change magnetic ink comprising a phase change ink carrier, an optional colorant, an optional dispersant, and metal nanoparticles dispersed within the phase change ink, wherein the metal nanoparticles comprise a thermally decomposed metal carbonyl; (2) melting the ink; and (3) causing droplets of the melted ink to be ejected in an imagewise pattern onto a substrate.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Example 1

Iron Containing Magnetic Ink Preparation. 90 grams of Unilin® 700 (fatty alcohol available from Baker Petrolite) were heated to melt at 140° C. under argon atmosphere in a 4 neck kettle equipped with a condenser, degassed under vacuum and refilled with argon. The temperature was then raised to 275° C. At this temperature, 20 milliliters of iron carbonyl $Fe(CO)_5$ (d=1.45 grams/milliliter) were added via a syringe in a drop-wise manner. The reaction was instant: color changes from light brown (iron carbonyl liquid) to black were observed, which is the result of formation of iron nanoparticles. The reaction mixture was cooled down and solidified.

Example 2

Particle Size at 110° C. Particle size of the metal particles in the melt ink of Example 1 was measured with a Malvern Zetasizer. Samples 1-4 and 6 were prepared using the ink of Example 1. Samples 1-4 and 6 were diluted with Unilin® 550 (fatty alcohol available from Baker Petrolite) for purposes of particle size measurement. FIG. 1 shows size distribution by intensity, intensity (%, y axis) versus size (d.nm, x axis) for Samples 1-4 and 6. The average particle size shown in FIG. 1 was Z-Average particle size of about 330 nanometers. (Polydispersity index=0.358).

Example 3

Figure 2:
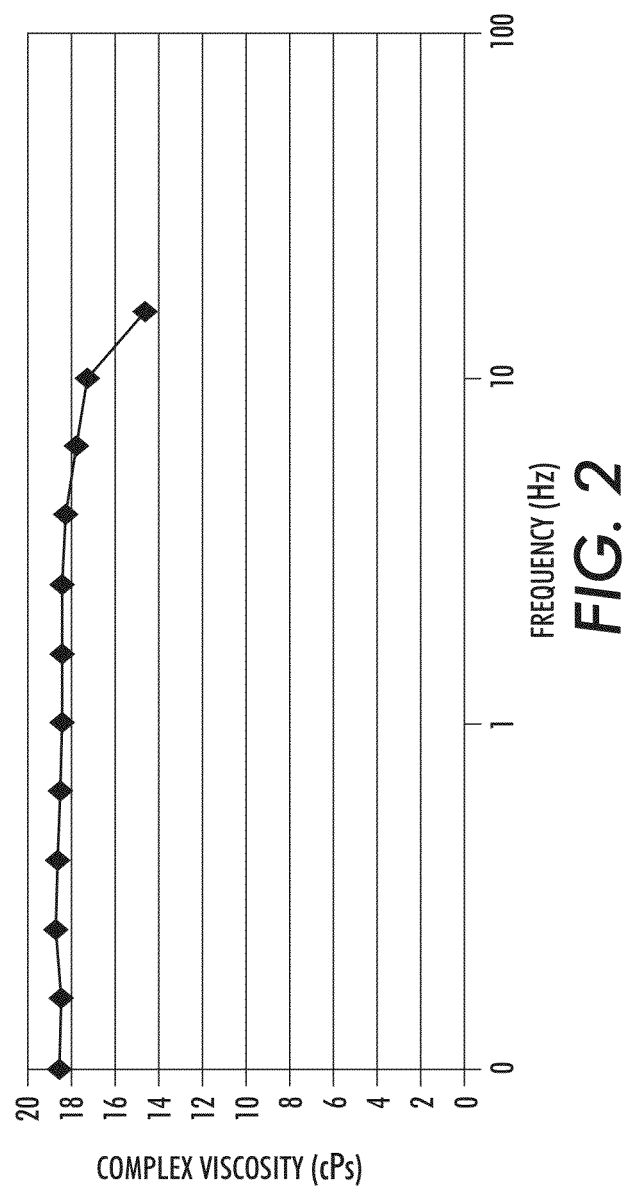
FIG. 2 is a graph showing complex viscosity (centipoise, y axis) versus frequency (Hz, x axis) for a magnetic ink of the present disclosure at 140° C.

Rheology of ink at 140° C. FIG. 2 shows the rheology of the ink of Example 1 at 140° C. as it was measured using a 50 millimeter cone and plate geometry on a RFS-III Rheometer, available from Rheometrics Corporation. The dynamic viscosities obtained at 0.1 and 10 Hertz (Hz) were 18.58 and 17.26 centipoise, respectively.

Example 4

Figure 3:
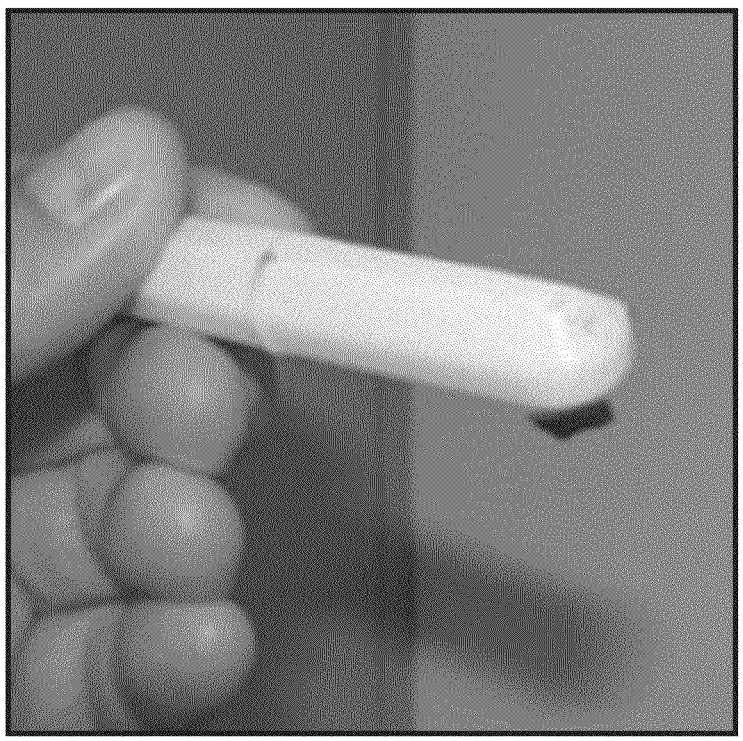
FIG. 3 is an illustration of the magnetic attraction of a solid ink of the present disclosure to a magnet.

Magnetic Property Demonstration. FIG. 3 demonstrates that the ink of Example 1 contains metal nanoparticles which renders the ink magnetically active. Small pieces of the solid ink described in Example 1 were placed in proximity to a magnet. The solid ink moved and got stuck to the magnet demonstrating that the ink contains magnetic metal nanoparticles.

In various embodiments, magnetic phase change inks herein can be prepared by reduction of metal carbonyl in a phase change ink composition. The process is a cost-effective one step process for preparing a phase change MICR ink that is versatile, has no ink base limitations, and that does not leave side products in the ink base. Advantages of the present process when compared with a typical pigment dispersion fabrication include: provision for a highly dispersible magnetic ink; provision for a highly stable ink (no settling of particles); process provides for safe handling of metal nanoparticles as they are already functionalized and "ink-ready;" provision of a cost effective process as conventional multi-step pigment processes are not required; a green process because the one-step process has a reduced energy requirement over previous complex multi-step processes; provides a MICR phase change ink suitable for phase change and solid ink technology platforms; provides a MICR phase change ink that is free of impurities and side products. The process and MICR phase change ink herein can be used in various applications including magnetic encoding and authentication of secure printed documents by detection of their inherent magnetic property.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change magnetic ink comprising:
a phase change ink composition comprising a carrier, an optional colorant, an optional dispersant, and
metal nanoparticles dispersed within the phase change ink, wherein the metal nanoparticles originate from an in situ thermal decomposition of a metal carbonyl in a melt composition comprising the phase change ink carrier, optional colorant, and optional dispersant; wherein the metal nanoparticles are directly stabilized by being functionalized with at least one of the phase change ink composition components.

2. The phase change magnetic ink of claim 1, wherein the metal nanoparticles are ferromagnetic or superparamagnetic.

3. The phase change magnetic ink of claim 1, wherein the metal nanoparticles are bimetallic or trimetallic particles.

4. The phase change magnetic ink of claim 1, wherein the metal carbonyl is selected from the group consisting of iron carbonyl, cobalt carbonyl, and nickel carbonyl.

5. The phase change magnetic ink of claim 1, wherein the metal carbonyl is selected from the group consisting of iron pentacarbonyl, di-iron nonacarbonyl, tri-iron dodecacarbonyl, cobalt tricarbonylnitrosyl, cyclopentadienylcobalt-tricarbonyl, dicobalt octacarbonyl, chromium hexacarbonyl, nickel tetracarbonyl, and dimanganese decacarbonyl.

6. The phase change magnetic ink of claim 1, wherein the phase change ink carrier comprises one or more materials selected from paraffins, microcrystalline waxes, polyethylene waxes, ester waxes, amide waxes, fatty acids, fatty alcohols, fatty amides, sulfonamide materials, tall oil rosins, rosin esters, ethylene/vinyl acetate copolymers, ethylene/acrylic acid copolymers, ethylene/vinyl acetate/acrylic acid copolymers, copolymers of acrylic acid with polyamides, ionomers, and mixtures thereof.

7. The phase change magnetic ink of claim 1, wherein the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid, and combinations thereof.

8. The phase change magnetic ink of claim 1, wherein the dispersant comprises at least a first dispersant and at least a second dispersant, wherein the first and second dispersants are different.

9. The phase change magnetic ink of claim 1, wherein the phase change magnetic ink is substantially free of metal salt impurities.

10. A process which comprises:
(1) incorporating into an ink jet printing apparatus a phase change magnetic ink comprising a phase change ink carrier, an optional colorant, an optional dispersant, and metal nanoparticles dispersed within the phase change ink, wherein the metal nanoparticles comprise a thermally decomposed metal carbonyl, wherein the metal nanoparticles originate from an in situ thermal decomposition of a metal carbonyl in a melt composition comprising the phase change ink carrier, optional colorant, and optional dispersant; wherein the metal nanoparticles are directly stabilized by being functionalized with at least one of the phase change ink composition components;
(2) melting the ink; and
(3) causing droplets of the melted ink to be ejected in an imagewise pattern onto a substrate.

11. A phase change magnetic ink comprising:
a phase change ink composition comprising a carrier, an optional colorant, and a dispersant;
wherein the dispersant comprises at least a first dispersant and at least a second dispersant, wherein the first and second dispersants are different; and
metal nanoparticles dispersed within the phase change ink, wherein the metal nanoparticles originate from an in situ thermal decomposition of a metal carbonyl in a melt composition comprising the phase change ink carrier, optional colorant, and optional dispersant.

* * * * *